United States Patent [19]
Kotani et al.

[11] Patent Number: 5,678,094
[45] Date of Patent: Oct. 14, 1997

[54] CAMERA EQUIPPED WITH A FUNCTION TO PREVENT DISPLACEMENT OF A FRAME

[75] Inventors: Noriyasu Kotani, Tokyo; Akio Nishizawa, Kanagawa-ken, both of Japan

[73] Assignee: Nikon Corporation, Tokyo, Japan

[21] Appl. No.: 606,939

[22] Filed: Feb. 26, 1996

[30] Foreign Application Priority Data

Mar. 29, 1995 [JP] Japan .................................. 7-071794

[51] Int. Cl.$^6$ ...................................................... G03B 1/00
[52] U.S. Cl. ................................................ 396/395; 396/441
[58] Field of Search ........................ 354/173.1, 173.11, 354/212, 213; 396/395, 397, 439, 440, 441, 442, 387

[56] References Cited

U.S. PATENT DOCUMENTS 3,712,200   1/1973   Beach ....................................... 396/400

FOREIGN PATENT DOCUMENTS 63-180839   11/1988   Japan .

*Primary Examiner*—Safet Metjahic
*Assistant Examiner*—J. K. Han
*Attorney, Agent, or Firm*—Oliff & Berridge

[57] ABSTRACT

The invention prevents film displacement without sacrificing the speedy photographic characteristics during the time of continuous photography. A part to prevent film displacement is moved to one of a contact position with a film and a removed position from the film. The part to prevent film displacement prevents a film displacement toward the direction of advancing film at the contact position. A driving device drives the part to prevent the film displacement. The photography control device carries out one time photography and the film advancement during the single mode setting and carries out the operation of photography and the film advancement alternately and repeatedly during the release operation. During the continuous photography mode setting, the device to control the film displacement controls the driving device and placed the part to prevent film displacement in the removed position only at the time of the film advancement after photography. During the single mode setting and the continuous photography mode setting, the part to prevent film displacement is placed in the removed position from the time prior to the commencement of the first photography to the completion of the advancement of a last frame.

15 Claims, 9 Drawing Sheets

CAMERA EQUIPPED WITH A FUNCTION TO PREVENT DISPLACEMENT OF A FRAME

BACKGROUND OF THE INVENTION

1. Field of the Invention

The present invention relates to a camera having a function to prevent the frame displacement of the film in the direction of advancement.

2. Description of Related Art

When an exterior of the camera sustains a shock, the film moves in the direction of film advancement, and frame displacement takes place resulting in a possibility that one portion of a frame being already exposed is exposed again. A device to prevent the frame displacement described above, for example, is disclosed by Japanese Unexamined Utility Model Publication Sho 63 (1988)-180839. This device is equipped with a pressure plate which maintains the flat surface of the film, pressing the film from the rear of the camera, a pressure plate coil with which this pressure plate is pressed to the film receiving surface, a film pushing coil being integrally formed with the pressure plate coil, and a film pushing part by which the surface of the film other than the effective image surface of the film is pushed toward the film receiving surface.

However, in the device which was disclosed in the Japanese Unexamined Utility Model described above, the surface other than the effective image surface of the film is constantly pushed in the direction of the film receiving surface, therefore, the load at the time when the film is fed is increased, which is a disadvantageous point. Therefore, it is thought that the part to prevent the frame displacement should be removed from the film at the time of film advancement. However, in this case, the part to prevent the frame displacement each time the film frame advancing is started/finished during continuous photography, the part to prevent the frame displacement is removed/brought into contact with the film, and as a result, the photography interval becomes longer and the photographic characteristics are quickly lost, which constitutes a problematic point.

SUMMARY OF THE INVENTION

The purpose of the present invention is to provide a camera being equipped with the function to be able to prevent frame displacement, without sacrificing the characteristics to photograph quickly during continuous photography.

In order to attain the purpose described above, the camera equipped with the function of the present invention to prevent the frame displacement is equipped with the following:

1. A part to prevent the displacement of the frame, being movable between a contact position in contact with the film and the position removed from the film; a driving device which drives the part to prevent the displacement of the frame between the contact position and the removed position; a switching device which switches from a single mode to a continuous photography mode; a photography control device which takes single photographs with a single release operation and advances the film in the single mode setting, and which repeats the operations of photography and advancement of the film frame simultaneously while the release operation is going on, in the continuous photography mode setting, and a device to control the frame displacement which controls the driving device so that in the single mode setting, the part to prevent the frame displacement is located at the removed position only when the film frame is advanced after photography, and in the continuous photography mode setting, the part to prevent the frame displacement locates to the removed position, during the time from prior to the first photograph at least to the time the last frame is advanced.

2. The invention is equipped with a release operation part which carries out the release operation and is capable of a preparatory operation prior to the release operation, and when in the continuous photography mode setting, the part to prevent the frame displacement is driven to the save location in response to the preparatory operation of the release operation, and at the same time, the part to prevent the frame displacement in response to the release of the release operation is driven to the contact position.

3. The invention is equipped with the release operation part described above, and in the continuous photography mode setting, the part to prevent the frame displacement prior to the first photography is started is at least driven to the removed position, in the case that both the release operation and the preparatory operation are released, and in the case that the release operation is not carried out for a second time even after passing a designated time after the release operation is released without releasing the preparatory operation, the part to prevent the frame displacement is driven to the contact position by controlling the driving device.

4. The invention when applied to a camera is able to carry out continuous photography repeating the photography operation which comprises the photography itself and the film frame advancement after photography, using a single release operation. And, it is equipped with the part to prevent the frame displacement described above, the driving device, and the control device which controls the driving device, in which the part to prevent the frame displacement is driven to the contact position after each film frame is fed and at the same time, the part to prevent the frame displacement is driven to the removed position before the next film frame is set, in the case when a plural number of photographic operations are carried out by a plural number of release operations, wherein which the part to prevent the frame displacement is maintained in the removed position from the time prior to advancing the first film frame at least to the completion of the last frame advancement, when the plural number of photography operations are carried out continuously by means of continuous photography.

With the invention described in item 1 above, during the single mode setting, the part to prevent the frame displacement is placed at the removed position only at the time the film frame is advanced after the photography operation. On the other hand, during the continuous photography mode setting, the part to prevent the frame displacement is placed at the removed position during the period prior to the commencement of the first photography at least to the time the last frame advancement is completed.

In the invention described in item 4 above, in the case when the plural number of photography operations by the plural number of release operation are carried out, the part to prevent the frame displacement is driven to the contact position after each film frame is fed, and at the same time, the part to prevent the frame displacement is driven to the removed position before the next film frame is fed. On the other hand, at the time when a plural number of photography operation are carried out by means of continuous photography, the part to prevent the frame displacement is maintained at the removed position during the time prior to the commencement of the first photography started at least to the completion of the last frame advancement.

BRIEF DESCRIPTION OF THE DRAWINGS

The invention will be described in detail with reference to the following drawings, wherein like numerals represent like elements and.

DETAILED DESCRIPTION OF PREFERRED EMBODIMENTS

The first embodiment according to the present invention is explained hereafter with reference to FIGS. 1–5.

Figure 1:
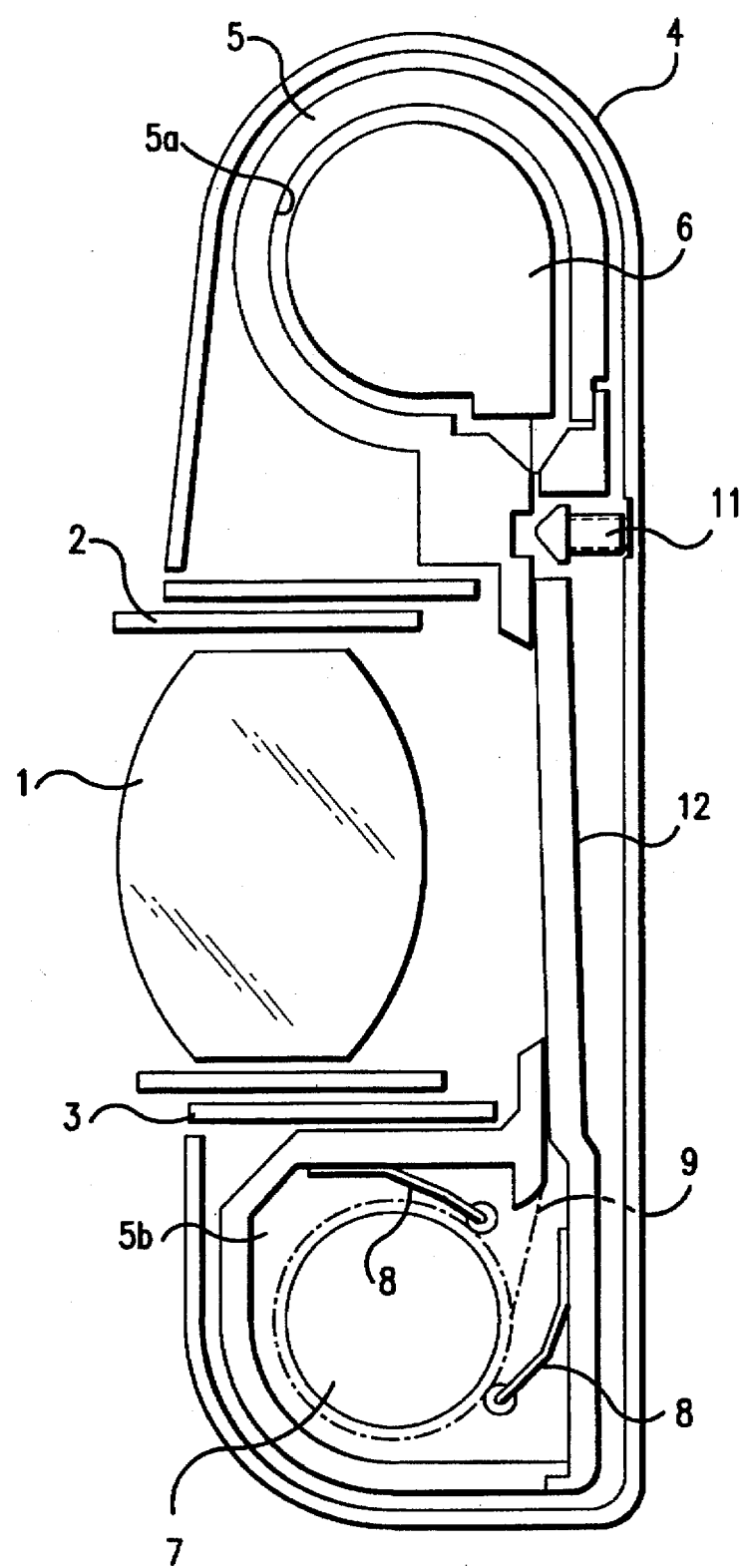
FIG. 1 is a flat cross sectional diagram of the camera containing the function to prevent the frame displacement according to the embodiment of the present invention.

FIG. 1 is a flat surface cross sectional diagram of the camera according to the present invention. Numerical code 5 is the camera main body, 4 is a cover to cover the camera main body, and 1 is the photography lens held in the lens holding part 2. The film cartridge room 5a in which the film cartridge 6 is mounted, is formed at one edge side of the camera main body 5, and at the same time, a spool room 5b, in which a spool 7 for film advancement is placed at the other edge side. The film 9, fed from the cartridge, is led to the spool room 5b passing through the space between the camera main body 5 and a back supporting plate 12. The film 9 is wound to the winding spool 7. Numerical code 8 is a roller which guides the advancement of the film 9 to the winding spool 7.

Figure 2:
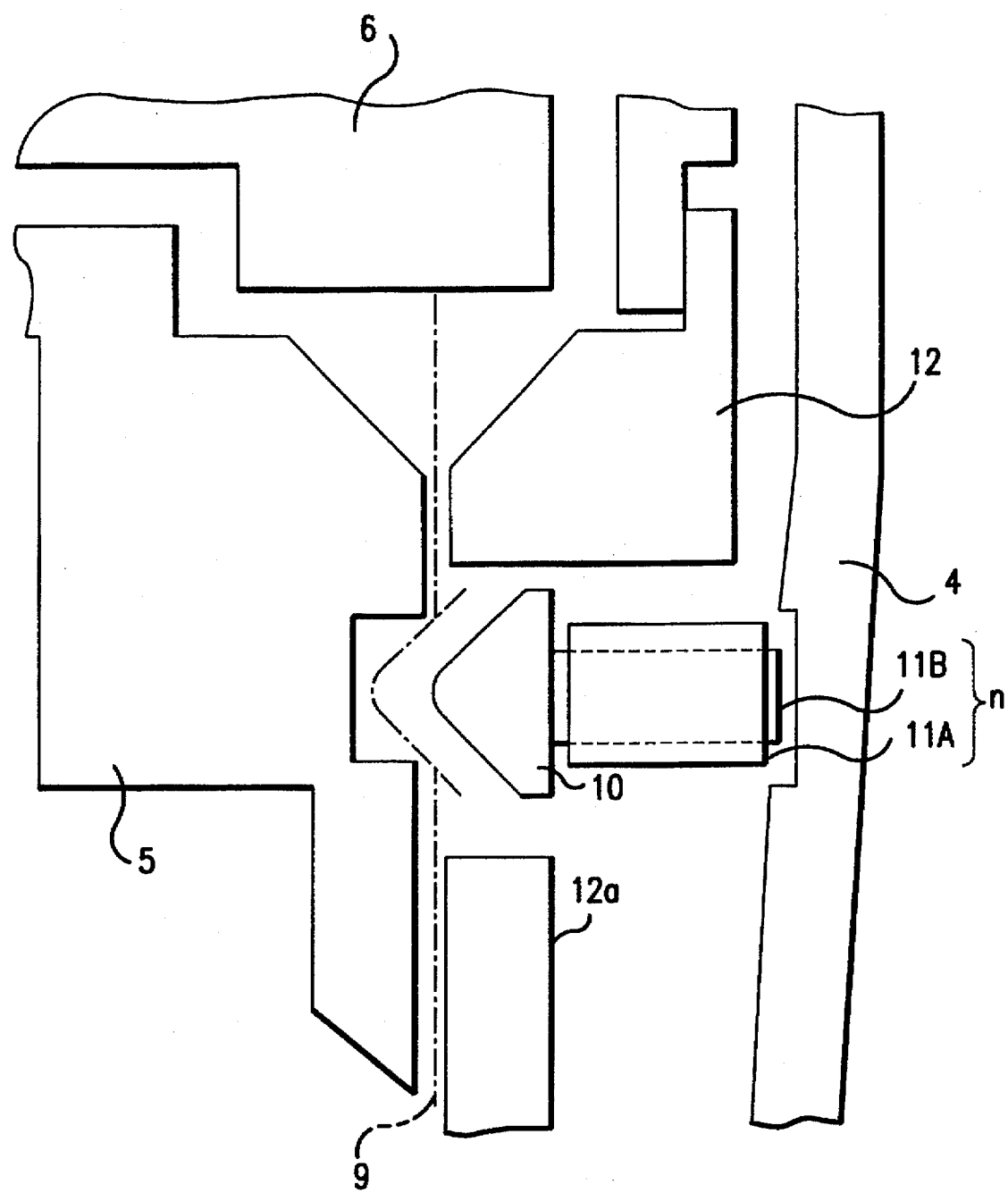
FIG. 2 is an enlarged drawing of the major parts shown in FIG. 1 explaining the details of the part to prevent the frame displacement.

In the vicinity of the cartridge room 5, a plunger 11 in the type of solenoid and the part to prevent the frame displacement 10 are placed in the space between the cover 4 and the camera main body 5. The plunger 11, as shown in FIG. 2, is comprised of a cylinder body 11a and an iron core 11b being movable in telescopic motion relative to the cylinder body 11a. The iron core 11b maintains an extended state by means of a coil with added force, not shown in the diagram, in the state that the electric conductivity is cut to the solenoid section (not shown in the diagram), and when the electricity is conducted to the solenoid section, it is contracted by the coil with added force.

The part to prevent the frame displacement 10, as shown in the diagram, is formed in a narrowing end shape, and is fixed to the edge of the iron core 11b facing the perforation forming section of the film. The part to prevent the frame displacement 10 by the telescopic motion of the iron core 11b, moves between the removed position shown by the actual line in the diagram through a hole 12a of the back support plate 12 and the protruded section (contact position) shown with 2 points broken line. At the protruded section, the part to prevent the frame displacement 10 goes through the perforation of the film 9, and at this time, the left and the right edge sections of the perforation is prevented from moving in the direction of the film advancement (in the direction of advancement and the direction of re-winding) being attached to the part to prevent the frame displacement 10. In the removed position, the part to prevent the frame displacement 10 is removed from the film 9, and the movement in the direction of advancement of the film 9 is allowed.

Figure 3:
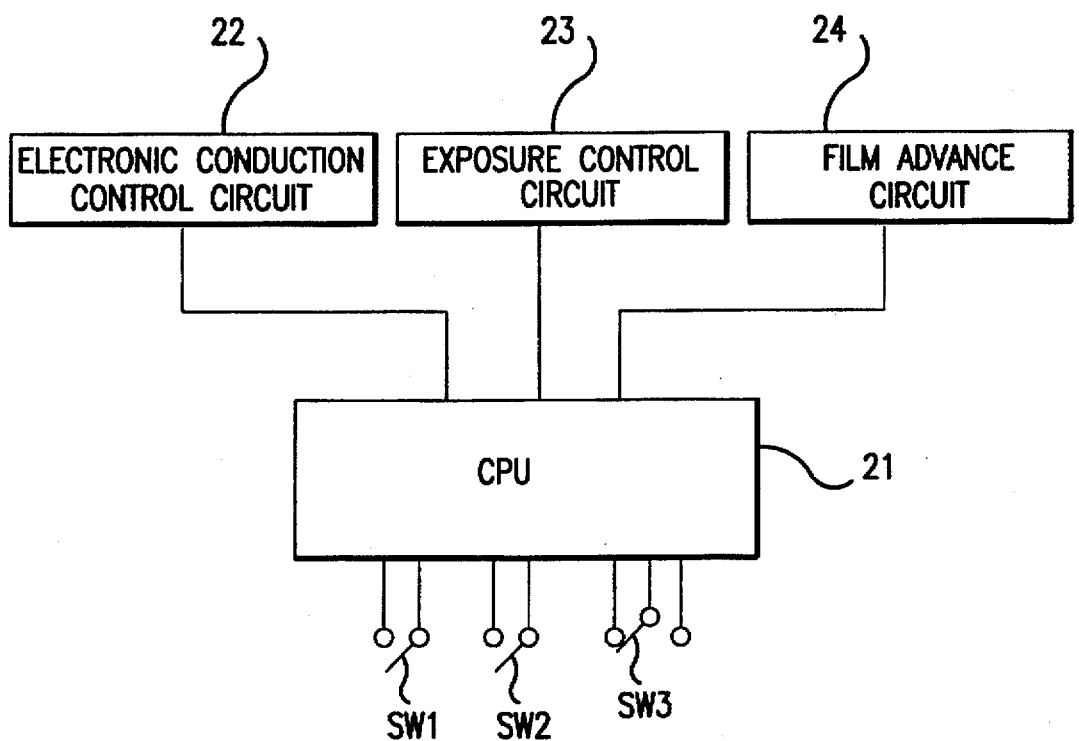
FIG. 3 is a block diagram showing the control system of the camera.

FIG. 3 shows the control system of the camera. To CPU 21, the following are connected:

An electric conduction control circuit 22 which controls the electric conduction to the plunger 11, an exposure control circuit 23 which carries out the photography by driving the aperture and shutter, not shown in the diagram, the film advancing circuit 24 which carries out the advancement and re-winding of the film by rotating the spool axis of the film winding spool 7 or the cartridge 6, a half-depression switch SW1 which carries out the ON operation coupled to the half depression operation (preparatory operation) of the release button, not being shown in the diagram, a release switch SW2 which carries out the ON operation coupled to the total depression operation (release operation) of the release button following the half-depression operation, and the mode switching switch SW3 which switches between the single mode and the continuous photography mode.

Figure 4:
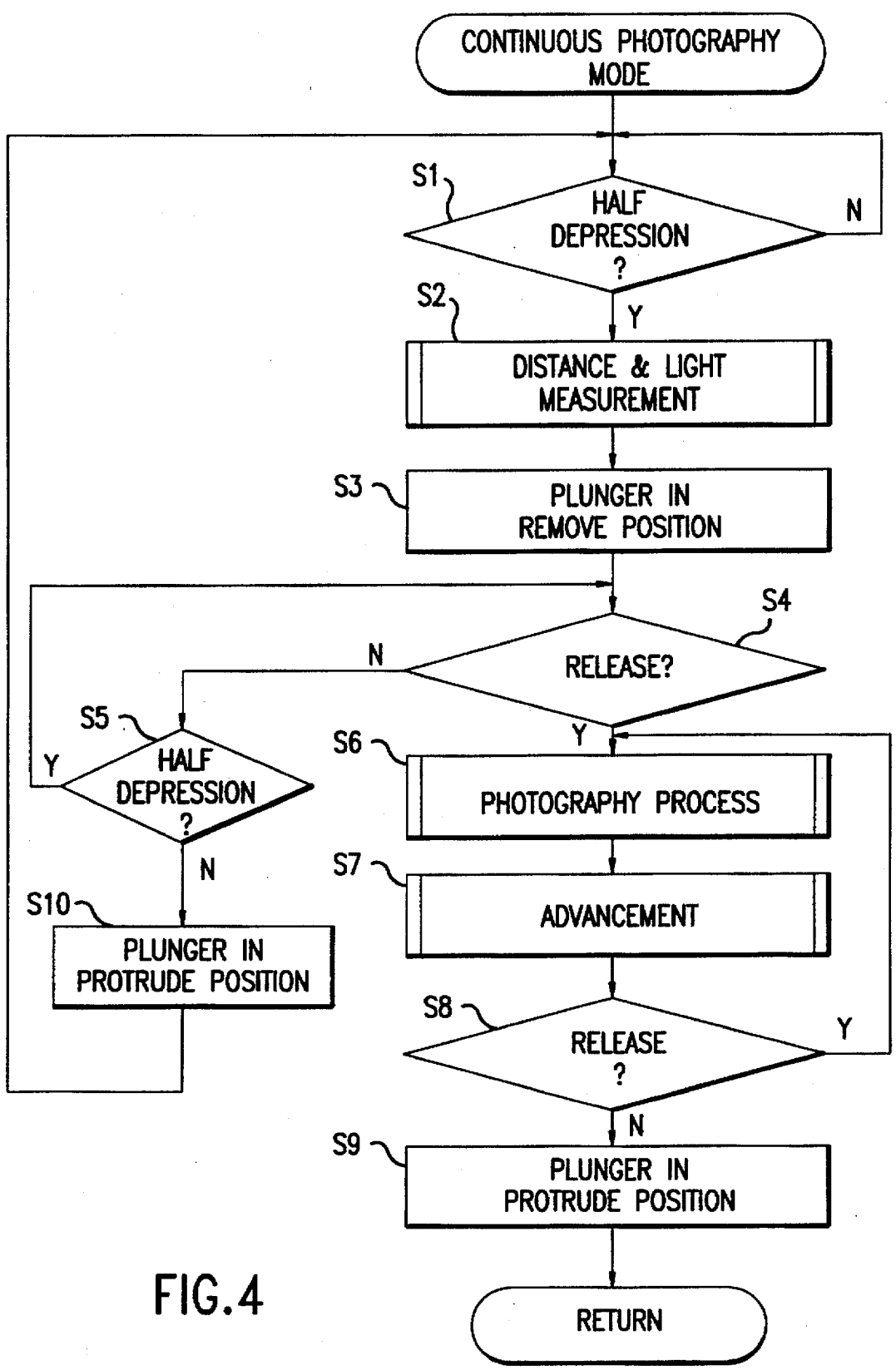
FIG. 4 is a flow chart to explain the operation during the continuous photography mode setting in the first embodiment.
Figure 5:
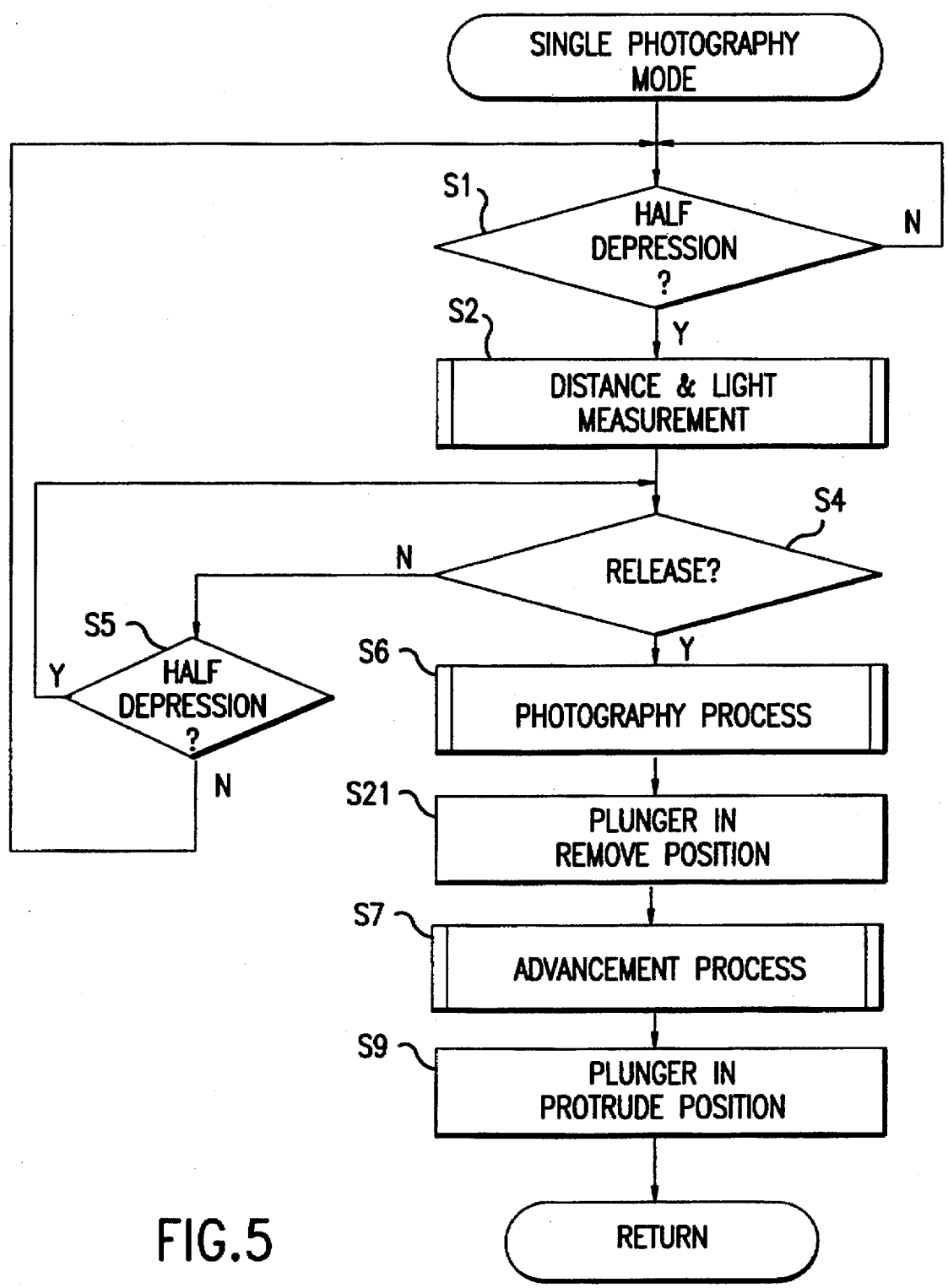
FIG. 5 is a flow chart to explain the operation during the single mode setting in the first embodiment.

Process of photography order by the CPU 21 is explained hereafter with reference to the flow chart shown in FIG. 4 and FIG. 5.

FIG. 4 shows the processing order during the continuous photography mode setting. This program is executed by the CPU 21, when the continuous photography mode is set by the mode switch over switch SW3. In step S1, the CPU 21 waits until the time that the half-depression switch SW1 is pushed to the ON position. When the half-depression switch SW1 is in the ON position, the CPU 21 goes to step S2 and carry out the distance measurement process and the light measurement process using the distance measurement device and the light measurement device (not shown in the diagrams). Then the CPU 21 goes to step S3. In step S3, the iron core 11b is contracted by electric conduction to the plunger 11 and the part to prevent the frame displacement 10 is driven to the removed position.

Subsequently, the CPU 21 goes to step S4. In step S4, the CPU 21 waits for the release switch SW2 to activate. If the release switch SW2 is not activated, the CPU 21 goes to step S5. In step S5, if the half-depression switch SW1 is in the OFF position, the CPU 21 advances to step S10 from step S5. In step S10, electric conduction to the plunger 11 is stopped and the part to prevent the frame displacement 10 is driven to the protruded position. Then the CPU 21 returns to step S1.

In step S4, if the release switch SW2 is activated in the ON position, the CPU 21 advances to step S6. In step S6, the photography process is carried out via the exposure control circuit 23. Then, the CPU 21 goes to step S7. In step S7, the film 9 is wound for 1 frame through the film advancing circuit 24. Then, the CPU 21 goes to step S8. In step S8, the ON/OFF position of the release switch SW2 is determined. If the release switch SW2 is in the ON position, the CPU 21 goes to step S6. Steps S6 and S7 are repeated until the release switch SW2 is in the OFF position. When the release switch SW2 is in the OFF position, the CPU 21 advances to step S9. In step S9, the electric conduction to the plunger is cut off and the part to prevent the frame displacement 10 is driven to the protruded position. Subsequently, the CPU 21 returns to other processes of a main routine.

As described above, during the continuous photography mode setting, the part to prevent the frame displacement 10, in accordance with the ON position (half-depression operation of the release button) of the half-depression switch SW1, is driven to the removed position. After the release switch SW2 is put in the ON position (the release button is operated with the total pushing), the continuous operation of the photography and the advancement of one frame are carried out until the time when the release switch SW2 is put in the OFF position. During this continuous photography operation, the part to prevent the frame displacement 10 is maintained at all times in the removed position, therefore, the photography interval can be shortened in comparison to the case that the part to prevent the frame displacement 10 is placed to the removed position or the protruded position each time one frame advancement is started or finished. In other words, it is possible to carry out continuous photography in the same manner as with the conventional photography intervals in spite of the fact that the part to prevent the frame displacement 10 is positioned, and there is no effect on the speedy photographic characteristics.

FIG. 5 shows the process order during the single photography mode setting. This program is executed by the CPU 21 when the single photography mode is set by the mode switch SW3. Identical step numbers are used for steps similar to the steps shown in FIG. 4.

In step S1, the CPU 21 waits until the time that the half-depression switch SW1 is pushed to the ON position. When the half-depression switch SW1 is in the ON position, the CPU 21 goes to step S2 and carry out the distance measurement process and the light measurement process using the distance measurement device and the light measurement device. Then, the CPU 21 goes to step S4.

In step S4, the CPU 21 waits for the release switch SW2 to activate. If the release switch SW2 is not activated, the CPU 21 goes to step S5. In step S5, if the half-depression switch SW1 is in the OFF position, the CPU 21 returns to step S1.

In step S4, if the release switch SW2 is activated in the ON position, the CPU 21 advances to step S6. In step S6, the photography process is carried out via the exposure control circuit 23.

In the step S21, the part to prevent the frame displacement 10 is driven to the removed position by conducting electricity to the plunger. Subsequently, the CPU 21 goes to step S7 and the film 9 is advanced by 1 frame. Then, the CPU 21 goes to step S9. In step S9, the part to prevent the frame displacement 10 is driven to the protruded position by putting electric conduction to the plunger. Then, the CPU 21 returns to other processes of the main routine.

In the manner described above, during the single photography mode setting, each time when the release switch SW2 is put in the ON position, the photography of a single time and the advancement operation of 1 frame of the film 9 are carried out, and the part to prevent the frame displacement 10 is placed at the removed position only at the time of advancing one frame. Therefore, it is possible to prevent the frame displacement with certainty, and at the same time, the part to prevent the frame displacement 10 does not add any load to the advancement of the film 9.

In the structure of the embodiment as explained above, the plunger 11 is composed of the cylinder body 11a and the iron core 11b, the mode switch SW3, the CPU 21, and the release switch SW2. The CPU 21 and the electric conduction control circuit 22 composing the device to control the frame displacement.

In addition, according to the above, during the continuous photography mode setting, the part to prevent the frame displacement 10 is driven to the removed position in accordance with the ON position of the half-depression switch SW1. However, it is appropriate to drive the part to prevent the frame displacement 10 to the removed position prior to the first photography after the release switch SW2 is put in the ON position.

In the first embodiment, the example that the two modes, that is, the single photography mode and the continuous photography mode, can be set. However, the second embodiment will be explained, hereafter, in which the single photography mode, slow speed continuous photography mode, and high speed continuous photography mode can be set.

Figure 6:
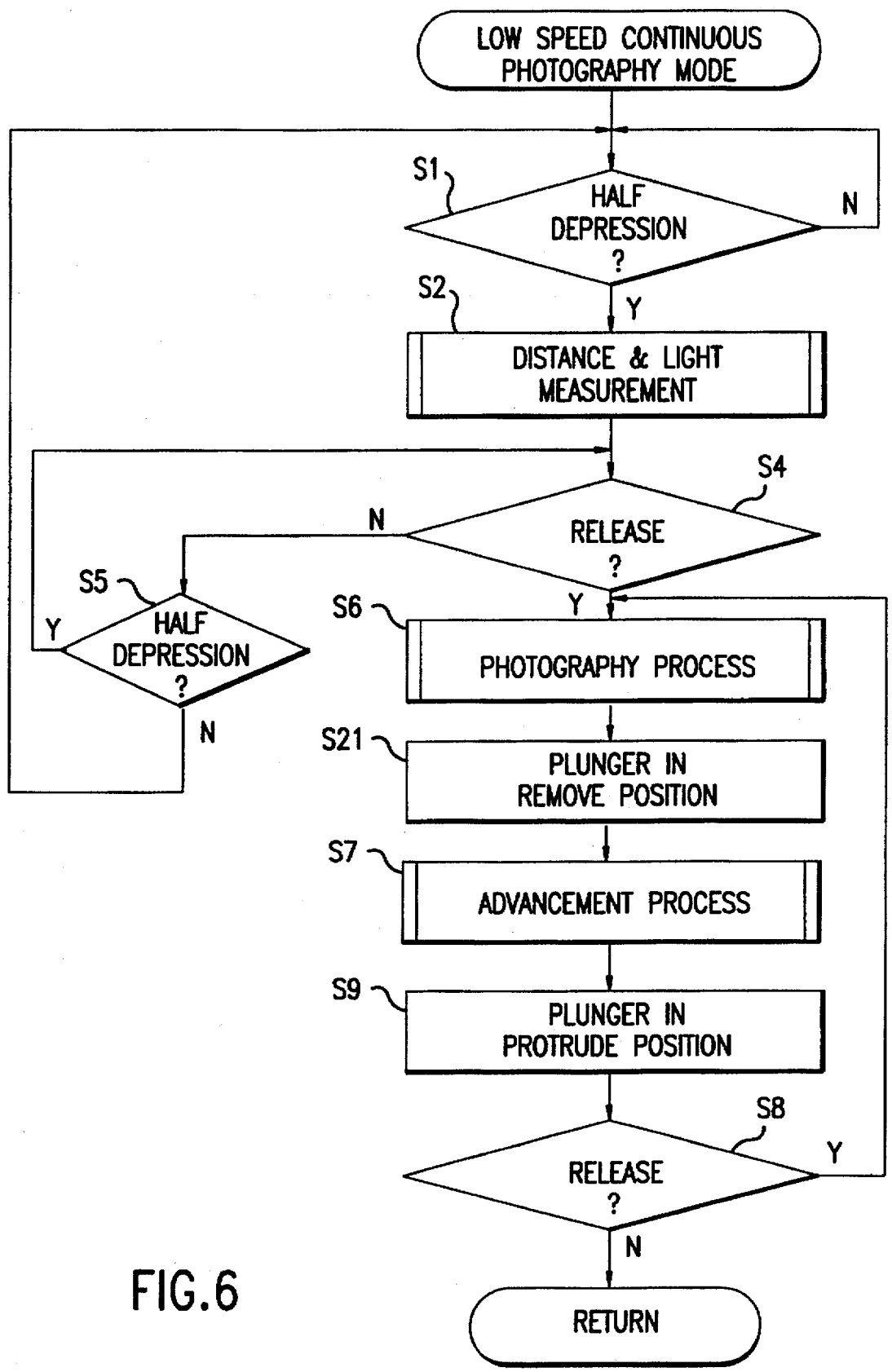
FIG. 6 is a flow chart to explain the operation during the low speed continuous photography mode setting in the second embodiment.

For the slow speed continuous photography mode, the camera structure in the embodiment according to the invention is the same that shown in FIGS. 1–3. In addition, FIG. 6 shows the processes during the low speed continuous photography mode setting. FIG. 6 is similar to FIG. 5. The difference among FIGS. 4, 5 and 6 are discussed below.

During the low speed continuous photography mode, the speedy photographic characteristics are not demanded as much, therefore, the part to prevent the frame displacement 10 is taken to the removed position or to the protruded position each time when the advancement of 1 frame is started or completed. In order to realize this process, steps S3 and S10 of the flow chart shown in FIG. 4 are eliminated, and at the same time, step S21 of FIG. 5 is inserted between steps S6 and S7. Step S9 is moved to between steps S7 and S8.

Figure 7:
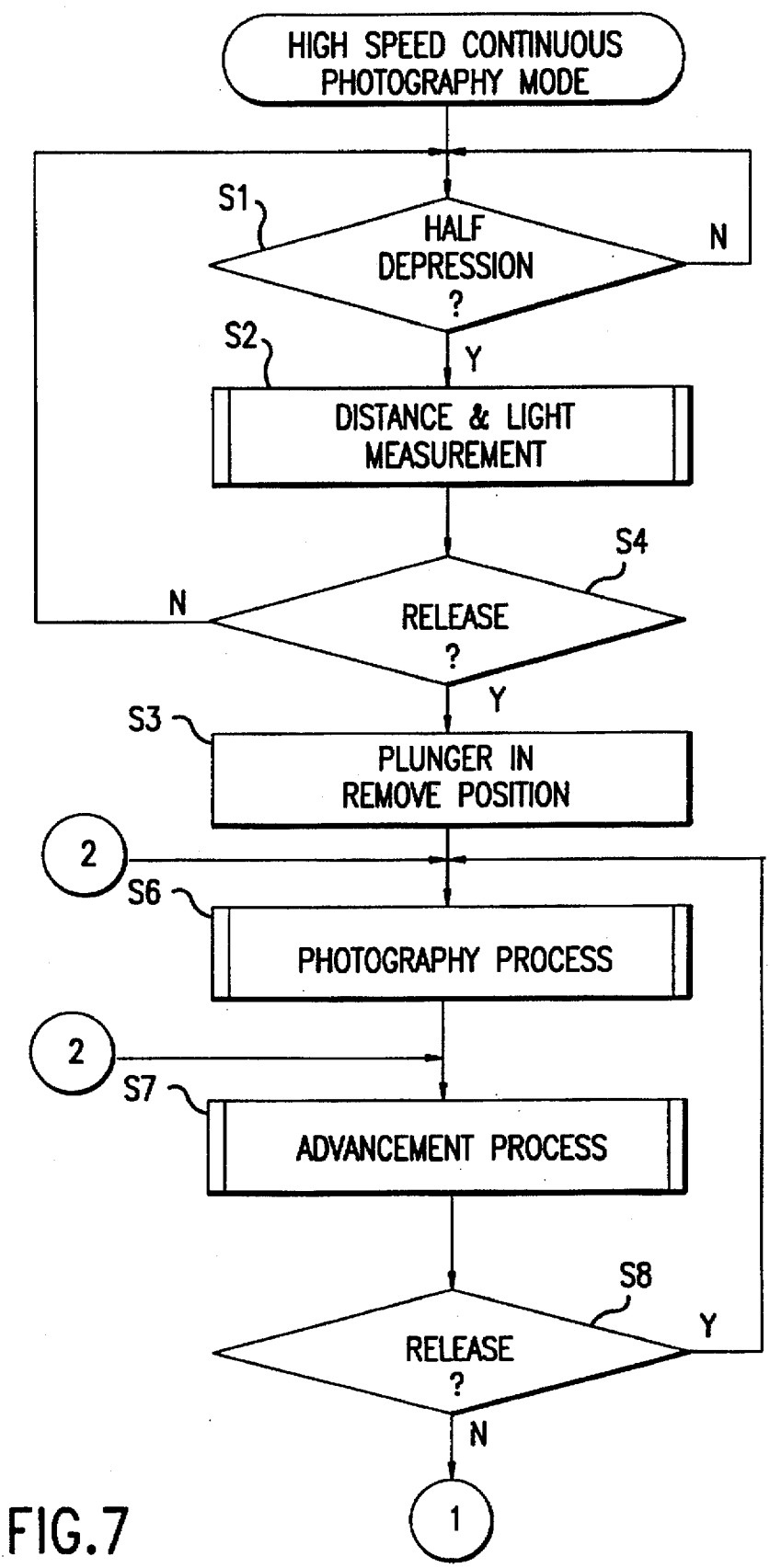
FIG. 7 is a flow chart to explain the operation during the high speed continuous photography mode setting in the second embodiment.
Figure 8:
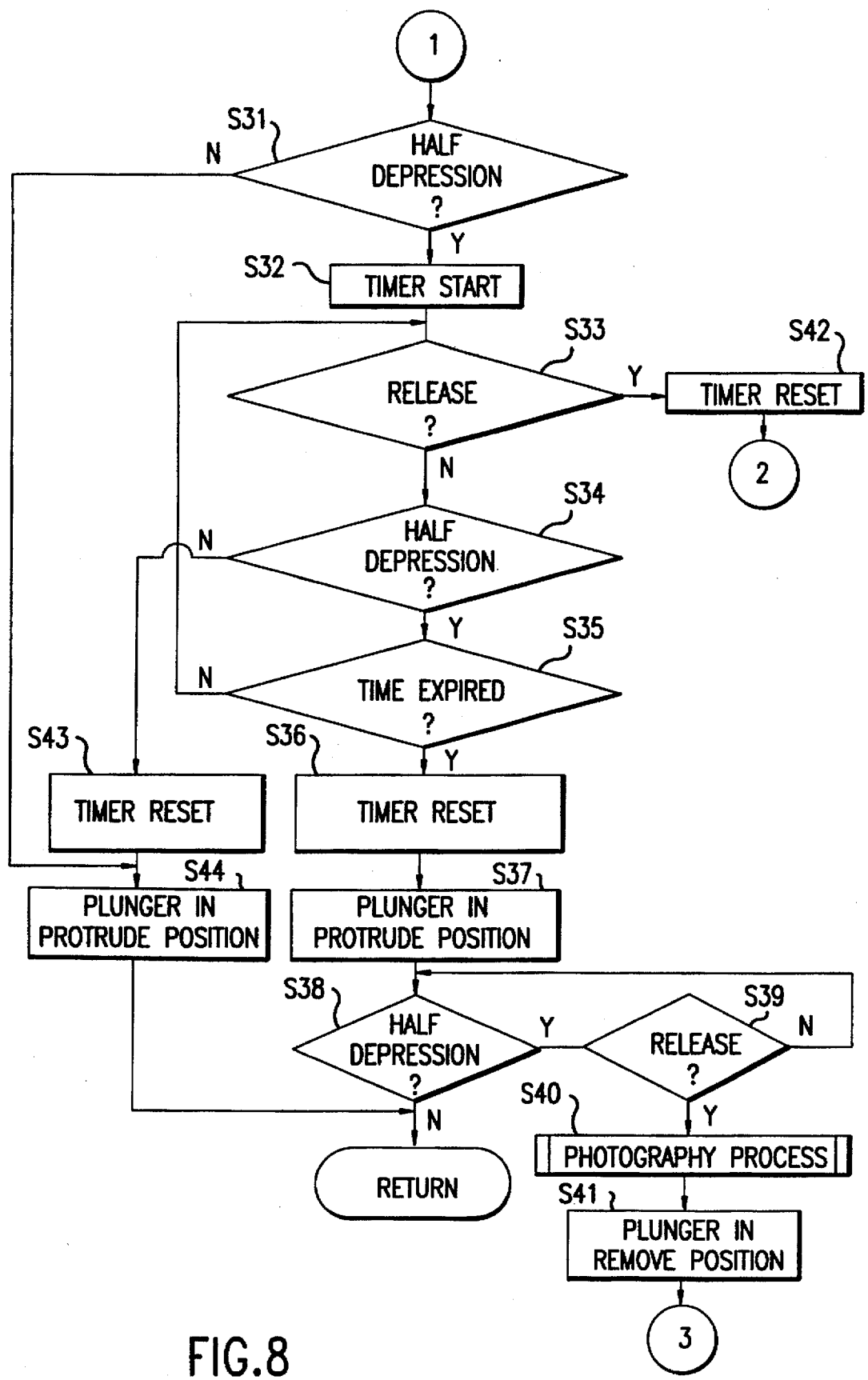
FIG. 8 is a flow chart which is the continuation of FIG. 7.

FIG. 7 and FIG. 8 show the flow chart during the high speed continuous photography mode setting. Identical step numbers are used for the steps that are similar to the steps shown in FIG. 4.

The CPU 21 executes step S1 and step S2 as described above with FIG. 4. After steps S1 and S2, the CPU 21 goes to step S4 and waits for the release switch SW2 to be put in the ON position. When the release switch SW2 is put in the ON position, the CPU 21 advances to the step S3, and the part to prevent the frame displacement 10 is driven to the removed position by conducting electricity to the plunger 11. Then, the CPU 21 goes to step S6. In the step S6, the photography of 1 frame of the film 9 is carried out. Then, the CPU 21 goes to step 7 and advances the film 9 by one frame. Then, the CPU 21 goes to step S8. If the release switch SW2 is in the ON position, the CPU 21 returns to step S6. Otherwise, the CPU 21 goes to step S31 shown in FIG. 8. Steps S6 and S7 are repeated until the release switch SW2 is put in the OFF position. Thus, the film 9 is wound with a higher speed than that of the low speed continuous mode setting.

In step S31, the ON or OFF position of the half-depression switch SW1 is determined. If the half-depression switch SW1 is set in the OFF position, the CPU 21 advances to step S44 and the part to prevent the frame displacement 10 is driven to the protruded position. Then, the CPU 21 returns to other processes of the main routine.

If the half-depression switch SW1 is set in the ON position, the CPU 21 advances to step S32 and a timer is started. Then, the CPU 21 goes to step S33. In step S33, the ON or OFF position of the release switch SW2 is determined. If the release switch SW2 is set at the ON position, the CPU 21 goes to step S42 and resets the timer. Then, the CPU 21 returns to step S6 shown in FIG. 7. If the release switch SW2 is set at the OFF position, the CPU 21 goes to step S34. In step S34, the ON or OFF position of the half-depression switch SW1 is determined. If the half-depression switch SW1 is set at the OFF position, the CPU 21 advances to the step S43 and resets the timer. Then, the CPU 21 goes to step S44.

In step S34, if the half-depression switch SW1 is set to ON, the CPU 21 advances to step S35. In step S35, the CPU 21 determines whether the timer has expired based on whether a designated time has passed or not from the time when timer was started. The timer expires when a designated time has passed. If the timer has not expired, the CPU 21 returns to the step S33. If the timer has expired, the CPU 21 goes to step S36 and the timer is reset. Then, the CPU 21 goes to step S37 and the part to prevent the frame displacement 10 is driven to the protruded position and the CPU 21 goes to step S38.

In step S38, the CPU 21 determines whether the half-depression switch SW1 is ON or OFF. If the half-depression switch SW1 is set to OFF the CPU 21 returns to other processes of the main routine. If the half-depression switch SW1 is set to ON, the CPU 21 goes to step S39. In step S39, the CPU 21 determines if the release switch SW2 is ON or OFF. If the release switch SW2 is set to OFF, the CPU 21 returns to step S38. If the release switch SW2 is set to ON, the CPU 21 goes to step S40. In step S40, photography takes place and the CPU 21 goes to step S41. In step S41, the part to prevent the frame displacement 10 is driven to the removed position and the CPU 21 returns to step S7 shown in FIG. 7.

As explained above, during the high speed continuous photography mode setting, the part to prevent the frame displacement 10 is driven to the removed position in accordance with the ON position of the release switch SW2. Then, the continuous photography process is started. If the release switch SW2 is set at OFF during the continuous photography process, the continuous photography process is stopped. Subsequently, the half-depression switch SW1 is put in the ON position, and the OFF state of the release switch SW2 continues for the designated time, and the part to prevent the frame displacement 10 is driven to the protruded position in mandatory manner. And then, if the release switch SW2 is switched ON for the second time, the continuous photography process is resumed again, and at the same time, the part to prevent the frame displacement 10 is driven to the removed position after the first photography. Thus, the part to prevent the frame displacement 10 is not removed from the film 9 during the time when the continuous photography process is stopped more than the designated time, and the frame displacement is controlled to the minimum.

Figure 9:
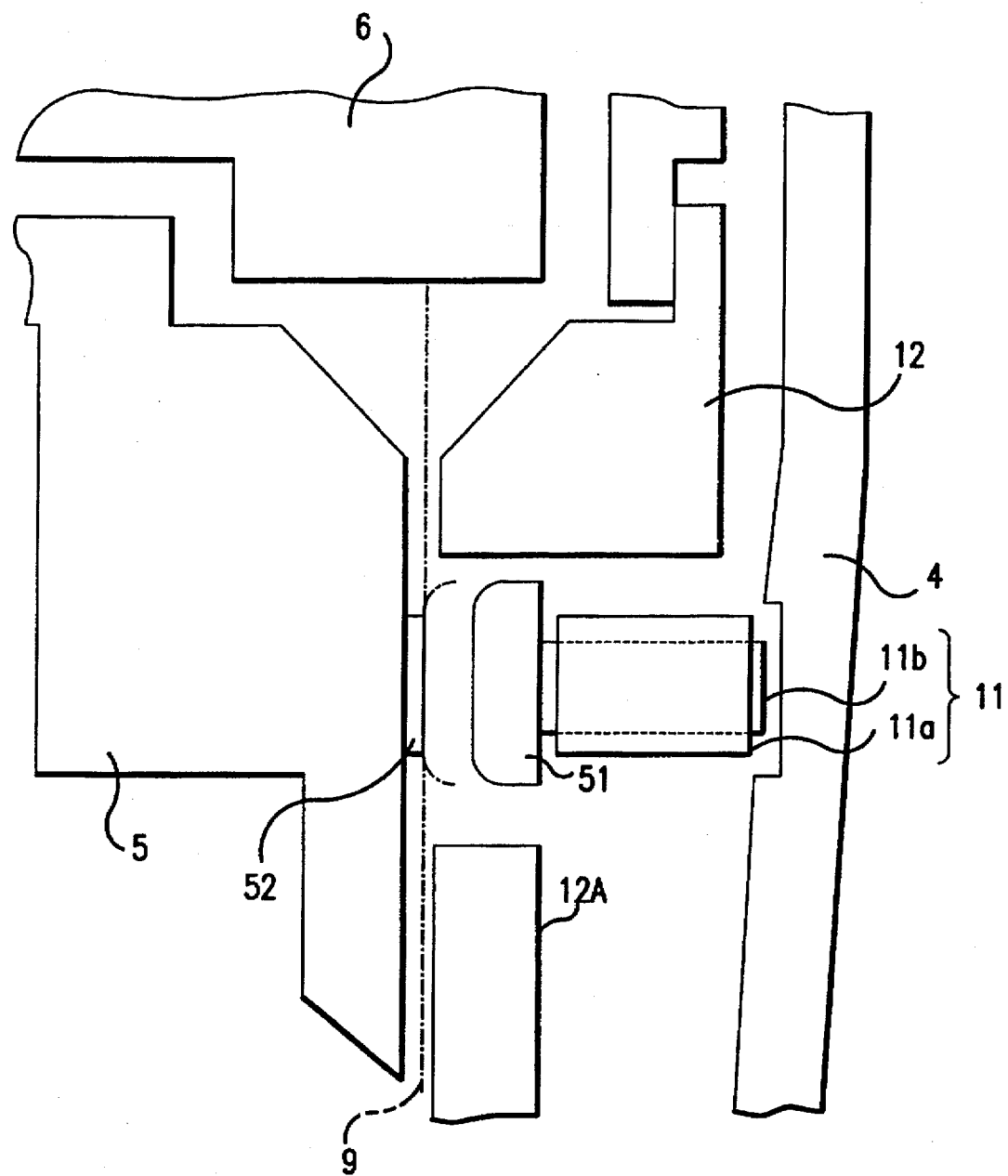
FIG. 9 is a drawing showing the variation of the part to prevent the frame displacement.

In the above, a type of the device to prevent the frame displacement is shown, in which the perforation of the film are passes through. However, for example, it is appropriate to prevent the frame displacement by pushing the film as shown in FIG. 9. In FIG. 9, 51 is the part to prevent the frame displace having a flat section at the end, and 52 is the elastic material such as felt and the like being adhered to the camera main body 5. When the part to prevent the frame displacement 51 is driven to the protruded position by the plunger 11, the film is pushed to the elastic material 52 by the flat surface section. The frame displacement of the film 9 is prevented by the above. If the part to prevent the frame displacement 51 is driven to the removed position, the movement toward the direction of advancing film 9 is allowed.

In addition, during the continuous photography mode, the part to prevent the frame displacement 10 is driven to the removed position in accordance with the process in which the half-depression switch SW1 or the release switch SW2 are set in the ON position. However, for example, it is appropriate that the part to prevent the frame displacement 10 is driven to the removed position in accordance with the continuous photography mode setting by the operation of the mode switch over switch SW3. In addition, for example, in the case that the release-lock takes place by an insufficient charge at the time when the continuous photography process is carried out using the electronic flash device, the part to prevent the frame displacement 10 is driven to the protruded position, and when the charge process is completed, it is appropriate to drive the part to prevent the frame displacement 10 to the removed position again. The part to drive the part to prevent the frame displacement 10 between the removed position and the protruded position is not limited to the plunger 11. For example, it is appropriate to use one which is equipped with a motor or the speed reducing gear structure. In addition, in the case that this is applied to the camera capable of having multiple exposures, the film frame advancing process does not take place at the time of the multiple exposure operation (operation to add plural exposures to 1 frame), therefore, it is desirable to position the part to prevent the frame displacement 10 at the protruded position, even when in the continuous photography mode.

In addition, in the above, an explanation is made concerning the camera which is capable of switching over between the continuous photography mode and the single mode. However, the present invention can be applied to the camera, which does not have the mode switching function described above, and the camera in which the photography operation (composed of photography and advancing the frame) at all times during the release switch SW2 is set in the ON position. In this case, for example, it is appropriate that the part to prevent the frame displacement 10 is driven to the removed position in accordance with the release switch SW2 being set in the ON position, and the part to prevent the frame displacement 10 is driven to the protruded position in accordance with the release switch SW2 being set in the OFF position. According to this, in the case the plural number of photographic operations is carried out by carrying out a plural number of release button operations or releases, the part to prevent the frame displacement 10 is placed at the removed position only at the time when the film frame is advanced. On the other hand, by continuing the release button operation, in other words, in the case that the plural number of photography operations is carried out by continuous photography, the part to prevent the frame displacement 10 is maintained at the removed position all throughout the continuous photography operation.

According to the present invention, during the continuous mode setting, it is so structured that the part to prevent the frame displacement 10, during the time prior to start the first photography at least to the advancement of 1 frame is completed, is placed in the removed position from the film 9. Therefore, the slowdown of the speedy photographic characteristics is prevented during continuous photography. In addition, during the single mode setting, the part to prevent the frame displacement 10 is placed in the removed position from the film only when the film frame advances after the photography process, therefore, the frame displacement can be prevented, without increasing the load at the time of film advancement.

According to the present invention, it is so structure that at the time when the plural number of photography operation can be carried out continuously by the plural number of release operation, the part to prevent the frame displacement 10, after each film frame advance, is driven to the contact position, and at the same time, the part to prevent the frame displacement 10, prior to the following film frame advance, is driven to the removed position. Therefore, the occurrence of frame displacement can be prevented during the time between the photography operations. On the other hand, at the time when a plural number of photography operations is carried out by continuous photography, the part to prevent the frame displacement 10 is maintained at the removed position during the period prior to the first film frame advance at least to the final frame advance is completed. Therefore, the speedy photographic characteristics during the continuous photography, in the same manner as described above, can be secured.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera that uses a film, comprising:
   a film displacement prevention device disposed adjacent to the film that prevents a film displacement when in a contact position and permits the film displacement when in a removed position; and
   a displacement controller coupled to the film displacement prevention device, wherein each of a plurality of photography operations is a sequence of photography and advancing the film, each of a plurality of release operations corresponds to one of the plurality of photography operations, the displacement controller setting the film displacement prevention device in the removed position before advancing the film and in the contract position after advancing the film for each of the plurality of photography and release operation, and the displacement controller setting the film displacement prevention device in the removed position for a continuous photography period if a release operation corresponds to continuously executing the plurality of photography operation, the continuous photography period extending from at least before advancing the film for a first photography operation of the plurality of photography operations to after advancing the film for a last photography operation of the plurality of photography operations.

2. A camera that uses a film, comprising:
   a film displacement prevention device disposed adjacent to the film that prevents a film displacement when in a contact position and permits the film displacement when in a removed position; and
   a displacement controller coupled to the film displacement prevention device, wherein if the camera is in a single photography mode, then the displacement controller sets the film displacement prevention device in the removed position when advancing a film and in the contact position when not advancing the film, and if the camera is in a continuous photography mode, then the displacement controller sets the film displacement prevention device in the removed position for a continuous photography period, the continuous photography period extending from before a first sequence of photography and advancing the film to after a last sequence of photography and advancing the film.

3. The camera of claim 2, further comprising:
   a switching device coupled to the displacement controller that switches the camera between the single photography mode and the continuous photography mode.

4. The camera of claim 3, wherein the continuous photography mode comprises:
   a low speed continuous photography mode and a high speed continuous photography mode, the switching device switching the camera among the single photography mode, the low speed continuous photography mode and the high speed continuous photography mode.

5. The camera of claim 2, wherein the film displacement prevention device comprises:
   a film displacement prevention member; and
   a driving device coupled to the displacement controller that sets the film displacement prevention member in one of the contact position and the removed position in response to a control signal from the displacement controller.

6. The camera of claim 2, further comprising:
   a release device coupled to the displacement controller that generates a release signal, the release signal being one of active and inactive; and
   a photography controller coupled to the release device, wherein if the camera is in the single photography mode, then the photography controller executes a sequence of photography and advancing the film once for each time a release signal transitions from inactive to active, and if the camera is in the continuous photography mode, then the photography controller repeats the sequence of photography and advancing the film whenever the release signal is active.

7. The camera of claim 2, further comprising:
   a release device coupled to the displacement controller that generates a pre-release signal and a release signal, the pre-release signal and the release signal being one of active and inactive, wherein if the camera is in the continuous photography mode, then the displacement controller sets the film displacement prevention device in the removed position when the pre-release signal is active and sets the film displacement prevention device in the contact position when the release signal transitions from active to inactive after the last sequence of photography and advancing the film.

8. The camera of claim 2, further comprising:
   a release device coupled to the displacement controller that generates a pre-release signal and a release signal, the pre-release signal and the release signal being one of active and inactive; and
   a timer device coupled to the displacement controller, wherein if the camera is in a high speed continuous photography mode, then the displacement controller sets the film displacement prevention device in the removed position before the first sequence of photography and advancing the film when both the pre-release signal and the release signal transition from inactive to active a first time, the displacement controller setting the timer to expire after a designated time in response to the pre-release signal transitioning from inactive to active a second time, the displacement controller setting the film displacement prevention device in the contact position if the timer expires before the release signal transitions from inactive to active a second time while the pre-release signal is active.

9. A camera that uses a film, comprising:

a film displacement prevention device disposed adjacent to the film that prevents a film displacement when in a contact position and permits the film displacement when in a removed position; and a displacement controller coupled to the film displacement prevention device, wherein the camera executes a plurality of photography operations, each of the plurality of photography operations being a sequence of photography and advancing of film, the displacement controller setting the film displacement prevention device in the removed position before advancing the film and in the contact position after advancing the film when the camera executes the plurality of photography operations in response to a plurality of release operations where each of the plurality of photography operations corresponds to one of the plurality of release operations, the displacement controller setting the film displacement prevention device in the removed position for a continuous photography period when the camera is continuously executing the plurality of photography operations in response to a single release operation, the continuous photography period extending from at least before advancing the film for a first photography operation of a plurality of photography operations to after advancing the film for a last photography operation of the plurality of photography operations.

10. The camera of claim 9, wherein the film displacement prevention device comprises:

a film displacement prevention member; and a driving device coupled to the film displacement prevention member that drives the film displacement prevention member in one of the contact position and the removed position in response to a control signal from the camera.

11. A method for preventing a film displacement in a camera that uses a film, comprising:

setting a film displacement prevention device disposed adjacent to the film in a removed position for permitting a film displacement when advancing a film if the camera is in a single photography mode;

setting the film displacement prevention device in a contact position for preventing the film displacement when not advancing the film if the camera is in the single photography mode; and setting the film displacement prevention device in the removed position for permitting the film displacement during a continuous photography period if the camera is in a continuous photography mode, the continuous photography period extending from before a first sequence of photography and advancing the film to after a last sequence of photography and advancing the film, wherein the film displacement prevention device is set by a displacement controller in one of the contact position and the removed position.

12. The method of claim 11, further comprising:

generating a release signal with a release device for controlling a photography controller, the release signal being one of active and inactive, wherein if the camera is in the single photography mode, then the photography controller executes a sequence of photography and advancing the film each time the release signal transitions from inactive to active, and if the camera is in the continuous photography mode, then the photography controller repeats the sequence of photography and advancing the film whenever the release signal is active.

13. The method of claim 11, further comprising:

generating a pre-release signal and a release signal with a release device for controlling the displacement controller, the pre-release signal and the release signal being one of active and inactive, wherein if the camera is in the continuous photography mode, then the displacement controller sets the film displacement prevention device in the removed position when the pre-release signal is active and sets the film displacement prevention device in the contact position when the release signal transitions from active to inactive after the last sequence of photography and advancing the film.

14. The method of claim 11, further comprising:

generating a pre-release signal and a release signal with a release device for controlling the displacement controller, the pre-release signal and the release signal being one of active and inactive; and setting a timer device to a designated time for determining when to set the film displacement prevention device to the contact position, wherein if the camera is in a high speed continuous photography mode, then the displacement controller sets the film displacement prevention device in the removed position before the first sequence of photography and advancing the film when both the pre-release signal and the release signal transition from inactive to active a first time, the displacement controller setting the timer to expire after the designated time in response to the pre-release signal transitioning from inactive to active a second time and then setting the film displacement prevention device in the contact position if the timer expires before the release signal transitions from inactive to active a second time while the pre-release signal is active.

15. The method of claim 11, further comprising:

generating a release signal for controlling the displacement controller, the release signal being one of active and inactive, wherein if the camera is in a low speed continuous photography mode and the release signal remains active for a plurality of photography and advancing the film sequences, then the displacement controller sets the film displacement prevention device in the remove position before advancing the film and sets the film displacement prevention device in the contact position after advancing the film for each of the plurality of photography and advancing the film sequences.

* * * * *